United States Patent
Twitchett

(10) Patent No.: US 10,512,920 B2
(45) Date of Patent: Dec. 24, 2019

(54) SANITARY INSERTION UNIT

(71) Applicant: NEOPERL GMBH, Mullheim (DE)

(72) Inventor: Simon Twitchett, Worchester (GB)

(73) Assignee: NEOPERL GMBH, Mullheim (DE)

( * ) Notice: Subject to any disclaimer, the term of this patent is extended or adjusted under 35 U.S.C. 154(b) by 0 days.

(21) Appl. No.: 15/555,403

(22) PCT Filed: Jan. 21, 2016

(86) PCT No.: PCT/EP2016/000108
§ 371 (c)(1),
(2) Date: Sep. 1, 2017

(87) PCT Pub. No.: WO2016/142022
PCT Pub. Date: Sep. 15, 2016

(65) Prior Publication Data
US 2018/0036748 A1    Feb. 8, 2018

(30) Foreign Application Priority Data
Mar. 9, 2015   (DE) .................. 20 2015 001 757 U

(51) Int. Cl.
*B05B 1/30*   (2006.01)
*E03C 1/084*  (2006.01)
(Continued)

(52) U.S. Cl.
CPC .......... *B05B 1/3006* (2013.01); *B05B 12/088* (2013.01); *E03C 1/084* (2013.01);
(Continued)

(58) Field of Classification Search
CPC ... B05B 1/3006; B05B 12/085; B05B 12/088; F16K 15/08; F16K 15/14; F16K 47/08
(Continued)

(56) References Cited

U.S. PATENT DOCUMENTS 3,847,178 A * 11/1974 Keppel ..................... F16K 1/36
                                                      137/515.7
5,027,861 A *  7/1991 Gute ...................... F16L 55/027
                                                         138/43

(Continued)

FOREIGN PATENT DOCUMENTS

DE         1473130 A1   11/1968
DE    202010007835 U1    9/2011
(Continued)

OTHER PUBLICATIONS

Translation of DE 202011100800.*

*Primary Examiner* — Viet Le
(74) *Attorney, Agent, or Firm* — Volpe and Koenig, P.C.

(57) ABSTRACT

A sanitary insertion unit includes an insertion housing in which at least one closing valve having an annular channel is provided. An annular valve body composed of elastic material is arranged in the annular channel, the valve body deforms under the pressure of the incident fluid in such a way that the valve body tightly closes the annular channel. The annular channel of the closing valve has a profile on an inner and outer channel wall. Via the profile, better controllability of the closing valve during the closing process of the valve body of the closing valve can be achieved and disturbing noises and vibrations are effectively avoided.

9 Claims, 2 Drawing Sheets

(51) Int. Cl.
  *G05D 7/01* (2006.01)
  *B05B 12/08* (2006.01)
  *F16K 31/00* (2006.01)
  *E03C 1/10* (2006.01)
  *E03C 1/02* (2006.01)

(52) U.S. Cl.
  CPC .............. *E03C 1/10* (2013.01); *F16K 31/002* (2013.01); *G05D 7/012* (2013.01); *E03C 2001/026* (2013.01)

(58) Field of Classification Search
  USPC ............ 239/533.13; 137/512.1, 512.15, 517; 138/37, 40–46; 261/38, 66
  See application file for complete search history.

(56) References Cited

U.S. PATENT DOCUMENTS

| | | | | |
|---|---|---|---|---|
| 6,571,831 B1 * | 6/2003 | Hart | ....................... | G05D 7/012 138/45 |
| 6,695,011 B2 * | 2/2004 | Sochtig | .................. | G05D 7/012 137/516.15 |
| 7,594,519 B2 * | 9/2009 | Hart | ........................ | G05D 7/012 138/43 |
| 7,753,070 B2 * | 7/2010 | Hart | ....................... | F16K 15/145 137/512.15 |
| 8,348,227 B2 * | 1/2013 | Zoller | .................. | G05D 7/0133 137/504 |
| 2006/0086397 A1 * | 4/2006 | Hart | ....................... | F16K 15/145 137/859 |
| 2013/0082121 A1 * | 4/2013 | Stein | .......................... | E03C 1/08 239/428.5 |
| 2014/0332097 A1 * | 11/2014 | Twitchett | ................. | G05D 7/012 137/504 |

FOREIGN PATENT DOCUMENTS

| | | |
|---|---|---|
| DE | 202011100800 U1 | 8/2012 |
| WO | 2004083698 A1 | 9/2004 |
| WO | 2012156002 A1 | 11/2012 |

* cited by examiner

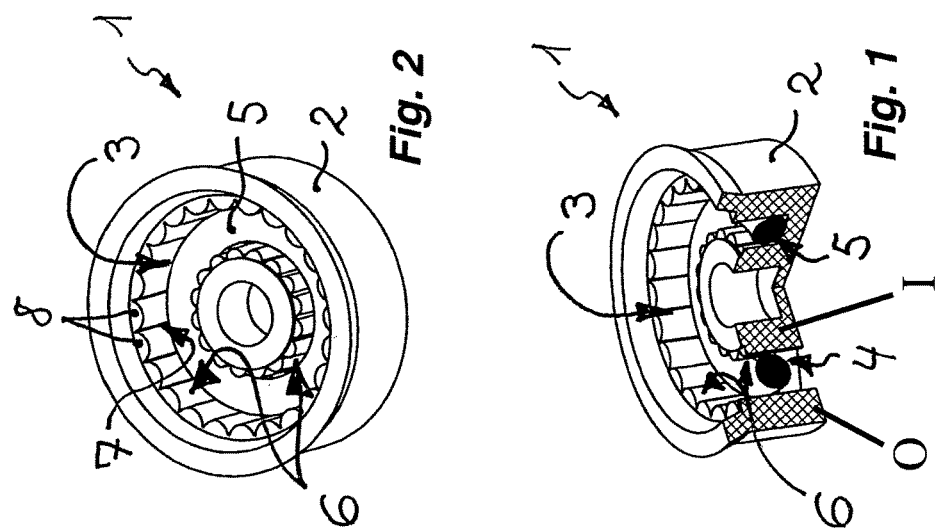
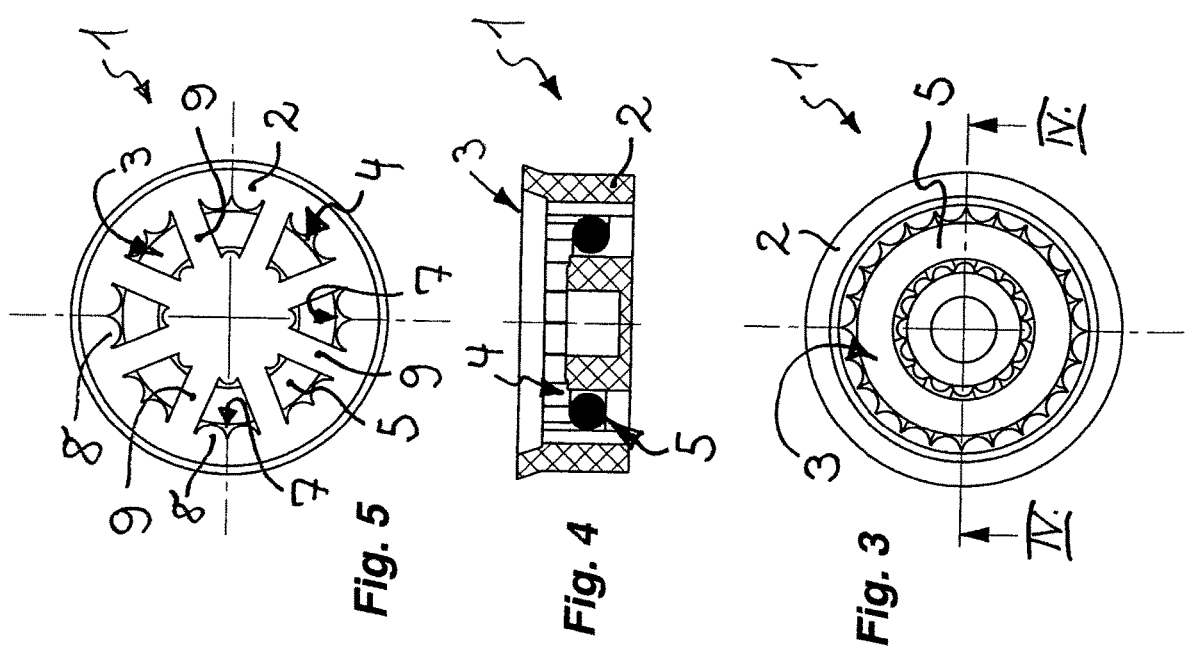

SANITARY INSERTION UNIT

FIELD OF THE INVENTION

The invention relates to a sanitary insert unit having an insert housing in which at least one closing valve having an annular channel is provided, in which annular channel an annular valve body made of resilient material is arranged which deforms under the pressure of the inflowing fluid such that the valve body tightly closes the annular channel.

BACKGROUND

A sanitary insert unit having a disk-like insert housing is already previously known from WO 2012/156002. The previously known insert unit has a flow rate regulator in its insert housing, said flow rate regulator being intended to regulate the water volume flowing through per unit time to a defined pressure-independent value. Also provided in the insert housing is a closing valve which moves into the closed position from an open position with increasing water pressure, and which, at low pressures, allows additional water quantities to flow through the insert housing past the flow rate regulator. The closing valve of the previously known insert unit, too, has an annular channel provided in the insert housing, in which annular channel an annular valve body made of resilient material is arranged which deforms under the pressure of the inflowing fluid such that the valve body tightly closes the annular channel. With increasing pressure, the resilient valve body is deformed such that the gaps between the valve body and the adjacent smooth channel walls of the annular channel become ever smaller and the flow rate of the water flowing through becomes ever greater such that a zone with negative pressure is even established on the outflow side of the closing valve, said zone counteracting the closing operation per se and causing the annular channel to open again. As a result of the deformation, brought about by the pressure difference, of the annular valve body, this valve body wants to close the annular channel again, and so a rapid succession of these operations occurs, which become noticeable as oscillations and bring about disruptive noise and vibrations.

Therefore, there is in particular the object of creating a sanitary insert unit having at least one closing valve, in which undesired oscillation formation and development of noise at the at least one closing valve is avoided.

This object is achieved according to the invention, in the sanitary insert unit of the type mentioned at the beginning, in particular in that the annular channel of the at least one closing valve has profiling on an internal and/or external channel wall.

SUMMARY

The sanitary insert unit according to the invention has an insert housing which is insertable at a suitable point in a sanitary supply line and in particular in a water pipe. Provided in the insert housing of the insert unit according to the invention is at least one closing valve having an annular channel in which an annular valve body made of resilient material is arranged. This resilient valve body deforms under the pressure of the inflowing fluid such that the valve body tightly closes the annular channel. In this case, the annular channel, provided for the valve body, of the at least one closing valve has profiling on an internal and/or external channel wall. As a result of this profiling provided on the internal and/or external channel wall of the annular channel of the at least one closing valve, better controllability of the closing valve during the closing operation can be achieved and at the same time undesired oscillation formation associated with disruptive noise and with vibrations can be avoided. As a result of the profiling provided on the internal and/or external channel walls, the water does not flow through with constant speed profiles around the circumference, but rather, as a result of the spacings caused by the profiling, the formation of a uniform speed or pressure profile of the water flowing through is disrupted, such that noise-inducing oscillation formation at the closing valve of the insert unit according to the invention is effectively avoided.

In this case, in a particularly advantageous and effective embodiment of the insert unit according to the invention, the profiling of the at least one closing valve is configured in an encircling manner on the channel wall.

In a particularly advantageous and at the same time also easily producible embodiment of the invention, the profiling is formed from alternate indentations and protuberances oriented in the direction of throughflow.

In this case, the indentations and/or the protuberances can have a polygonal or else a rounded, preferably semicircular, cross-sectional contour.

According to an advantageous embodiment of the invention, each indentation is configured as the region arranged between two protuberances that preferably immediately adjoin one another.

In an embodiment that is particularly easy to produce, in which the insert housing of the insert unit according to the invention is also producible in one piece, the external channel wall is connected to the internal channel wall of the at least one annular channel via preferably radially oriented connecting webs, and the valve body of the at least one closing valve bears on the connecting webs arranged on the outflow side of the at least one annular channel.

In a particularly effective embodiment according to the invention, the insert unit has at least two closing valves, which are preferably provided concentrically with one another in the insert housing.

It is possible for the insert unit, in addition to at least one closing valve, to also have a backflow preventer in its insert housing.

In a particularly advantageous insert unit of the type mentioned at the beginning, which is versatile to use, the insert unit, in addition to at least one closing valve, also has a flow rate regulator and/or a jet regulator in its insert housing. Since the at least one closing valve only passes into its closed position with increasing liquid pressure, it is possible, with the aid of the closing valve, to guide an additional quantity of water through the insert unit according to the invention, past the flow rate regulator and/or the jet regulator, in the event of low liquid pressures.

In this case, in a preferred embodiment according to the invention, the at least one closing valve is connected upstream of a jet regulator and in particular a jet splitter of the jet regulator or is connected alongside the latter as a bypass.

Developments of the invention can be gathered from the following description in conjunction with the drawings and the claims. The invention is described in more detail in the following text with reference to a preferred exemplary embodiment.

BRIEF DESCRIPTION OF THE DRAWINGS

In the drawings:

FIG. 1 shows a sanitary insert unit, illustrated in a partial longitudinal section, which has at least one closing valve having an annular channel in its insert housing, in which annular channel an annular valve body made of resilient material is arranged, FIG. 2 shows the insert unit from FIG. 1 in a perspective plan view of its inflow side, FIG. 3 shows the sanitary insert unit from FIGS. 1 and 2 in a plan view of its inflow side, FIG. 4 shows the insert unit from FIGS. 1 to 3 in a longitudinal section through the section plane Iv-Iv in FIG. 3, FIG. 5 shows the insert unit from FIGS. 1 to 4 in a plan view of its outflow side and FIG. 6 shows an alternate embodiment of the insert of the insert of FIGS. 1-5.

DETAILED DESCRIPTION OF THE PREFERRED EMBODIMENTS

Figure 6:
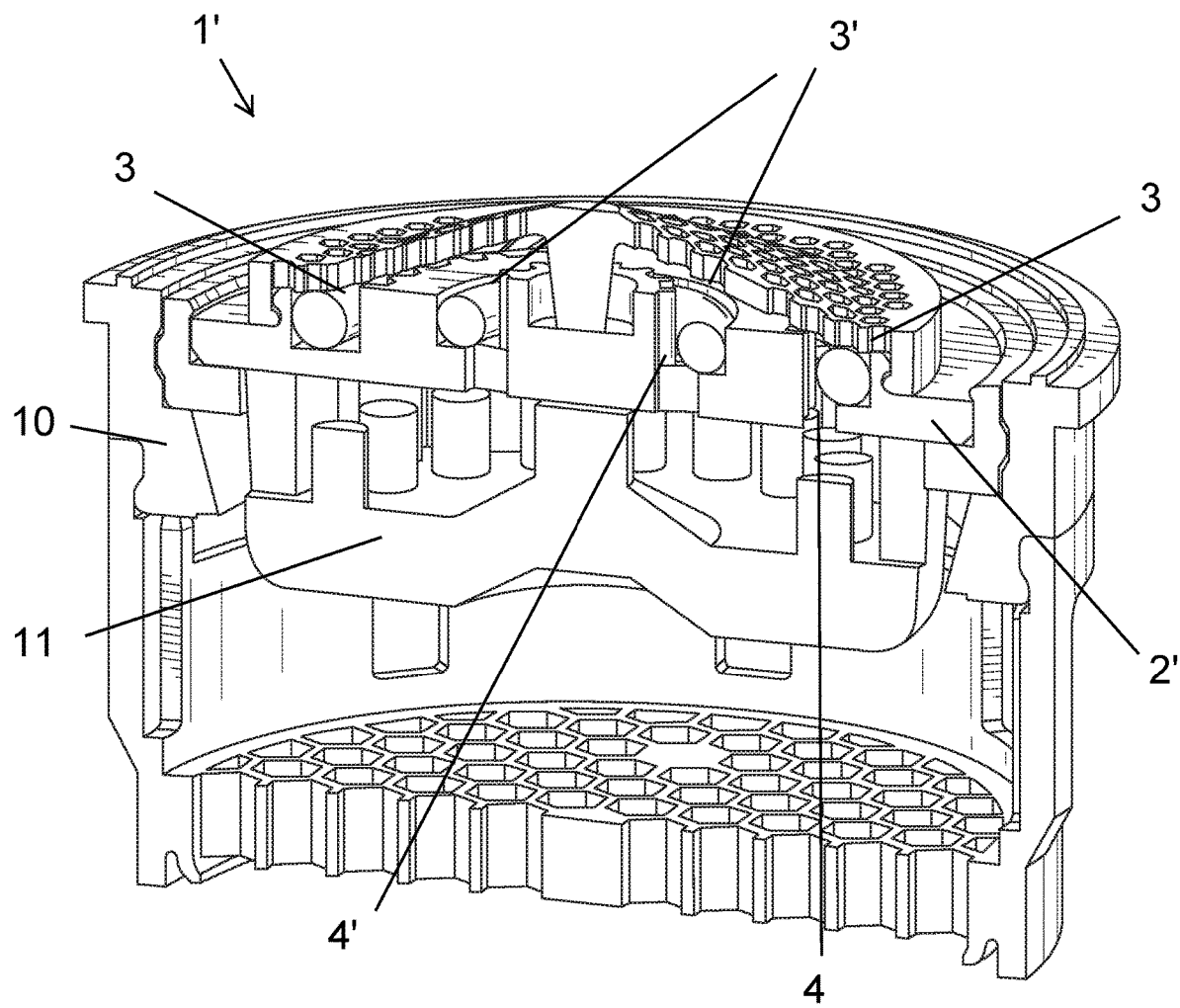

FIGS. 1 to 5 illustrate a sanitary insert unit 1 having an insert housing 2 in which at least one closing valve 3 having an annular channel 4 is provided. Arranged in the annular channel 4 of the insert unit 1 is an annular valve body 5 made of resilient material, which deforms under the pressure of the inflowing fluid such that the valve body 5 tightly closes the annular channel 4.

The insert unit 1 can be inserted into a sanitary supply line and in particular into a water pipe at a suitable point with its insert housing 2. The valve body 5 located in the annular channel 4 of the at least one closing valve 3 deforms under the pressure of the inflowing fluid such that the valve body 5 tightly closes the annular channel 4. In this case, the annular channel 4, provided for the valve body 5, of the at least one closing valve 3 has profiling 6 on an internal and/or external channel wall (I, O). In the exemplary embodiment illustrated in FIGS. 1 to 5, such profiling 6 is provided both on the internal (I) and on the external (O) channel wall.

It is clear, from comparing FIGS. 1 to 5, that the profiling 6 is configured in an encircling manner on the channel walls (I, O). In this case, the profiling 6 provided on the channel walls (I, O) is formed from alternate indentations 7 and protuberances 8 oriented in the direction of throughflow. While each protuberance 8 in this case has a rounded and in particular approximately semicircular cross-sectional contour, each indentation 7 is configured as the region arranged between two protuberances 8 that immediately adjoin one another.

It is clear from the plan view of the outflow side of the insert housing 2 in FIG. 5 that the external channel wall (O) is connected to the internal channel wall (I) of the at least one annular channel 4 via connecting webs 9 that are oriented approximately radially in this case, wherein the resilient valve body 5 of the at least one closing valve 3 bears on the connecting webs 9 arranged on the outflow side of the at least one annular channel 4.

In an alternate embodiment as shown in FIG. 6, the insert unit 1' can also have at least two closing valves 3, 3' in its insert housing 2', which preferably have annular channels 4, 4' that are arranged concentrically with one another in the insert housing 2'.

As a result of the profiling 6 located on the channel walls (I, O) arranged on both sides of the annular channel 4, better controllability of the closing valve 3 during the closing operation is achievable and in the process, disruptive noise and vibrations are avoided. Since the profiling 6 is provided on the internal (I) and/or external (O) channel wall of the annular channel 4 of the at least one closing valve 3, and since constant speed profiles of the water flowing through cannot form around the annular channel circumference on account of the alternate indentations and protuberances 7, 8 of the profile 6, and since, instead, the formation of such a regular speed or pressure profile in the closing valve 3 of the insert unit according to the invention is disrupted, oscillation formation associated with undesired noise and vibrations is effectively avoided. It goes without saying that, in addition to the at least one closing valve 3, further closing valves and in addition to or instead of the latter also a backflow preventer, a flow rate regulator and/or a jet regulator can also be provided in the insert housing 2 of the insert unit 1. In this case, in a preferred embodiment, as shown in FIG. 6, according to the invention, the at least one closing valve 3, 3' is connected upstream of a jet regulator 10 and in particular a jet splitter 11 of the jet regulator 10 or is connected alongside the latter as a bypass.

LIST OF REFERENCE SIGNS

1 Sanitary insert unit
2 Insert housing
3 Closing valve
4 Annular channel
5 Valve body
6 Profiling
7 Indentation
8 Protuberance
9 Connecting web

What is claimed is:

1. A sanitary insert unit (1) having an insert housing (2), with a single flow path, in which at least one closing valve (3) having an annular channel (4) is provided in said housing (2), said annular channel (4) defined by an inner channel wall (I) and an outer channel wall (O), the annular channel (4) having an annular valve body (5) made of resilient material is arranged therein, which deforms under pressure of an inflowing fluid such that the valve body (5) tightly closes the annular channel (4), wherein the single flow path is maintained upstream of the valve body (5) and wherein the annular channel (4) of the at least one closing valve (3) has profiling (6) on both the inner channel wall (I) and the outer channel wall (O), the inner and outer walls (I, O) facing each other with the single flow path and arranged annular channel (4) between them.

2. The sanitary insert unit as claimed in claim 1, wherein the profiling (6) is configured in an encircling manner on the inner and outer channel walls (I, O).

3. The sanitary insert unit as claimed in claim 2, wherein the profiling (6) is formed from alternate indentations (7) and protuberances (8).

4. The sanitary insert unit as claimed in claim 3, wherein at least one of the indentations (7) or the protuberances (8) have a rounded, semicircular, cross-sectional contour.

5. The sanitary insert unit as claimed in claim 3, wherein each indentation (7) is configured as a region arranged between two protuberances (8) that immediately adjoin one another.

6. The sanitary insert unit as claimed in claim 1, wherein the outer channel wall (O) is connected to the inner channel wall (1) of the at least one annular channel (4) via radially oriented connecting webs (9), and the valve body (5) of the at least one closing valve (3) bears on the connecting webs (9) arranged on an outflow side of the at least one annular channel (4).

7. The sanitary insert unit as claimed in claim 1, wherein the insert unit (1) has at least two closing valves (3), which are provided concentrically with one another in the insert housing (2).

8. The sanitary insert unit as claimed in claim 1, wherein the insert unit (1), in addition to the at least one closing valve (3), further comprises at least one of: a flow rate regulator or a jet regulator in the insert housing (2).

9. The sanitary insert unit as claimed in claim 1, wherein the at least one closing valve (3) is connected upstream of a jet regulator and a jet splitter of the jet regulator in a flow direction or is connected alongside the jet regulator.

* * * * *